Jan. 25, 1955 J. H. POWERS 2,700,509
WASTE FOOD GRINDER
Filed April 15, 1952 2 Sheets-Sheet 2
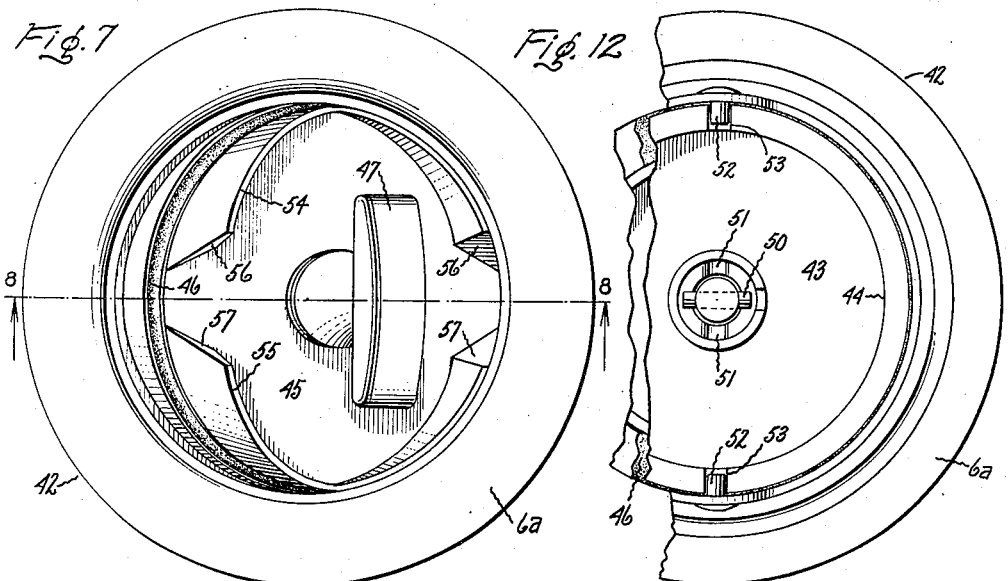
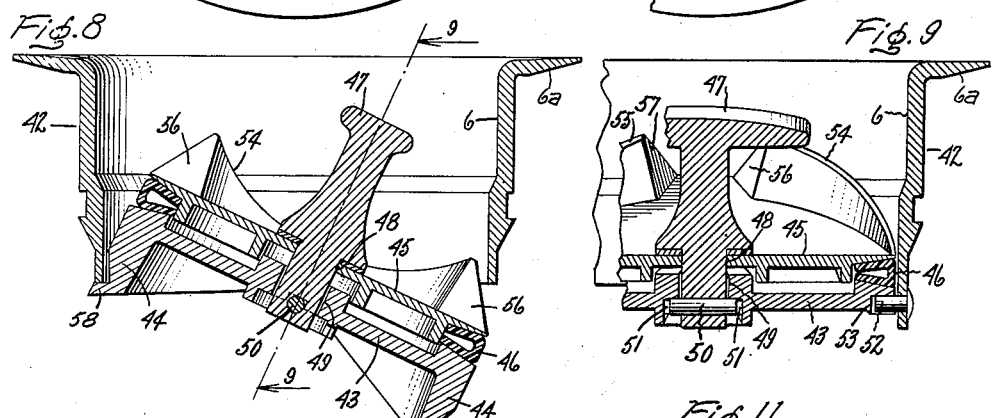
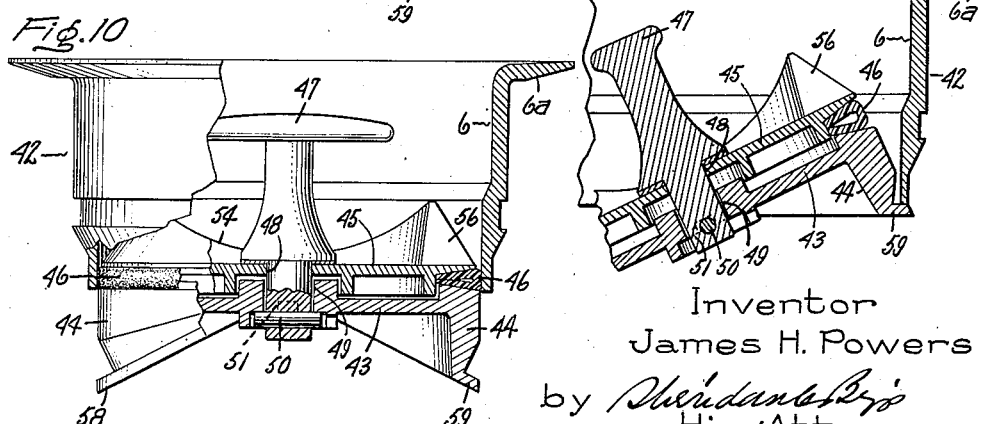
Inventor
James H. Powers
by *Sheridan &c.*
His Attorney United States Patent Office 2,700,509
Patented Jan. 25, 1955

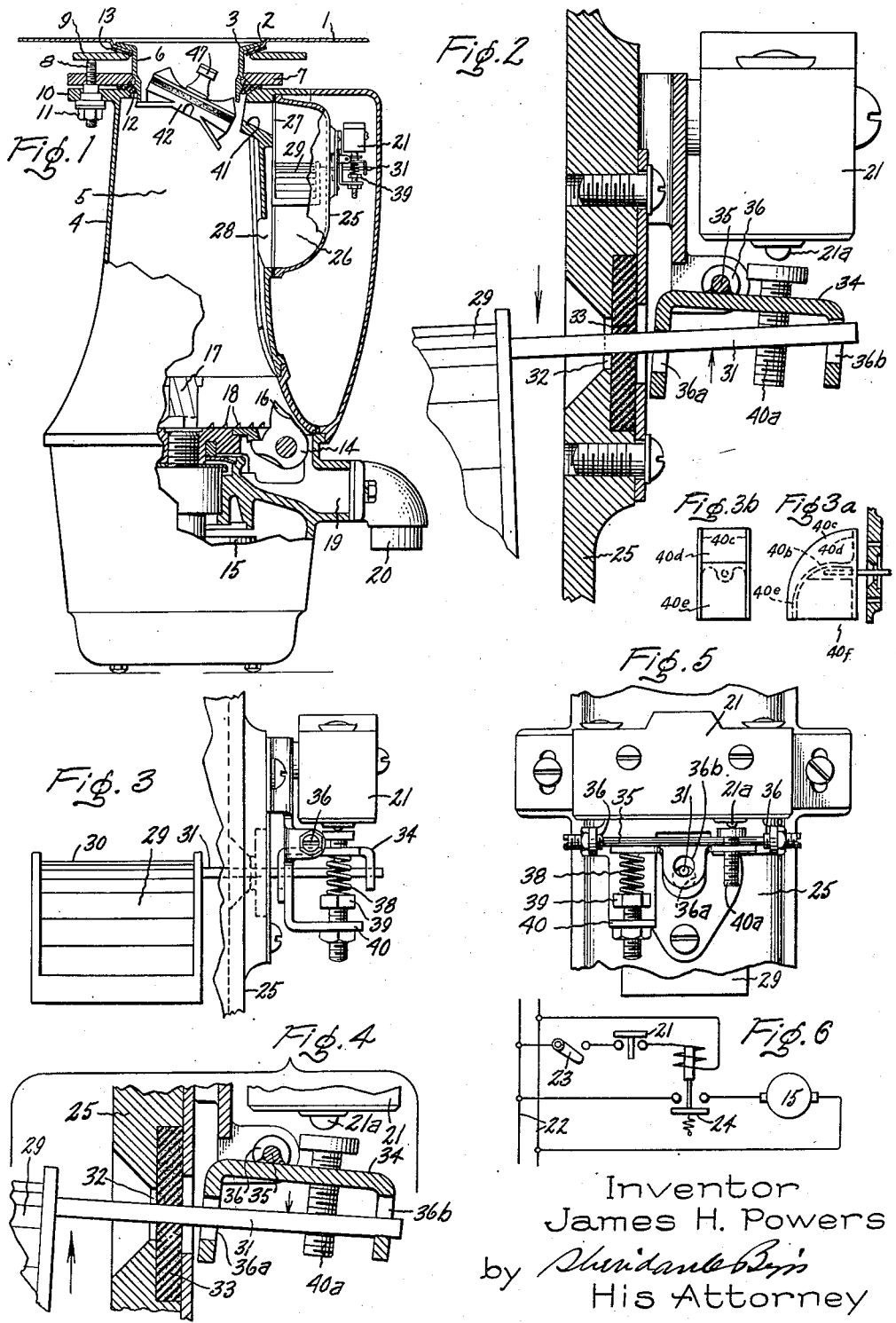

2,700,509

WASTE FOOD GRINDER

James H. Powers, Westport, Conn., assignor to General Electric Company, a corporation of New York Application April 15, 1952, Serial No. 282,300

2 Claims. (Cl. 241—46)

This invention relates to power driven waste food grinders, more particularly to the kind for the disposal of garbage and other forms of waste material by comminution of the material into a sewer or the like by the aid of water supplied to the grinder.

While it is not limited thereto, this invention more particularly is concerned with motor driven waste food grinders which are used in connection with a kitchen sink adapted to receive the waste food and water supply through the drain opennig of the sink, and to discharge the material mixed with the water into the drain provided for the sink.

An object of this invention is the provision of improved control means including a combined motor control and stopper or closure means for the sink drain opening, and also the provision in the control system of means preventing operation of the comminuting mechanism of the appliance in the absence of a supply of water adequate for the comminuting operation.

In certain power driven waste food disposers of this type heretofore known, there is provided for insertion in the sink opening a removable combination power control and sink opening and stopper element. This element is removable from the opening to open it so that garbage and other waste material may be inserted into the machine; and while it is positioned in the opening, is operable to a control position to operate a switch to condition the machine for operation, and to other positions, in one of which it prevents operation of the machine and at the same time seals the opening, and in still another of which it also prevents operation of the machine but affords a passage through the element for draining of the sink, the last two named positions providing for normal sink functioning. Locking means are provided which prevent removal of the control element while the machine is operating and thereby effectively minimizes the danger of injury to the operator due to careless or ignorant operation.

This invention has as an object the provision of a greatly simplified and less expensive control means including a highly effective control and stopper element (which I will call the master control element), and yet which possesses all of the controlling and sink draining and sealing functions of the prior control element, and retains its inherent features as regards the safety and yet which eliminates the necessity for both the control switch and the locking means.

This control conditions the machine for operation merely by moving it to a position to direct the water draining from the sink to cause it to flow in a particular direction. The control system includes a control element for the motor which is operated by the water flowing in this particular direction and will effect operation of the motor only when a flow of a predetermined amount is supplied.

In addition to the foregoing, the flow responsive element (which I will call the secondary control) will effect control of the grinder even though no water is flowing to it from the sink, but there has accumulated in the grinding chamber a sufficient quantity of water caused by a stoppage of the flow of water and waste material from the grinding chamber to the drain, which condition may occur, for example, when there has been supplied to the grinding chamber such a quantity of waste material, or waste material of such nature as substantially to block the flow of water through the grinding chamber.

Other objects as well as the details of that which I believe to be novel in my invention will become apparent from the following description and the claims appended thereto, taken in connection with the accompanying drawings wherein Fig. 1 is an elevation, partly in section, of a waste disposal apparatus embodying this invention; Fig. 2 is a fragmentary sectional view illustrating the secondary control means referred to above; Fig. 3 is a fragmentary view illustrating certain elements of the secondary control but in different operating positions than the corresponding elements occupy in Fig. 2; Fig. 3a is an elevation view, partly in section, of an element of modified form used in the secondary control; Fig. 3b is a front elevation of the element shown in Fig. 3a; Fig. 4 is a fragmentary view, in general similar to Fig. 2, but illustrating the control elements in different operative positions; Fig. 5 is an elevation view of the mechanism shown in Figs. 2, 3 and 4 looking in from the right of these figures; Fig. 6 is a diagrammatic view illustrating the driving motor for the grinder apparatus, together with certain control elements therefor; Fig. 7 is a plan view of the master control; Fig. 8 is a sectional view taken through the line 8—8 of Fig. 7 and looking in the direction of the arrows; Fig. 9 is a fragmentary view taken through the line 9—9 of Fig. 8 and looking in the direction of the arrows; Fig. 10 is a partial sectional view similar to Fig. 8 but showing certain elements in different operative positions; Fig. 11 is a fragmentary view similar to Fig. 8 but showing the master control in a different operative position; and Fig. 12 is a bottom plan view of the master control element shown in Figs. 7 to 11, inclusive.

Referring to the drawings, this invention has been shown in one form as applied to a waste food grinder or disposal unit of the type such as used in connection with a sink. As shown in Fig. 1, there is a sink bottom 1 which is provided with a depressed circular flange 2 around a drain opening 3. The grinding apparatus comprises a grinder housing 4 defining a vertically positioned chamber 5 extending below the drain opening 3. The grinder housing and associated parts are joined to the sink bottom 1 by means of a cup-shaped fitting 6 having a flange 6a at the top which rests upon the sink flange 2. The housing 4 is attached to the cup-shaped member 6 by means of a circular flange 7 fixed to the member 6. Threaded through the flange 7 are a series of bolts 8 which bear at their upper ends against a web or annulus 9 which bears against the underside of the depressed flange of the sink; these bolts function to clamp the member 6 to the sink. The lower ends of the bolts 8 are directed through apertures provided for them in an outwardly extending flange 10 on the upper end of the housing 4, which flange, and thus the housing, is secured by means of nuts 11 threaded on the bolts. Preferably, and as shown, there will be interposed between the top edge of the housing 4 and the flange 7 a gasket or seal 12, and likewise there will be interposed between the web 9 and the bottom of the sink flange 2 a gasket 13, the two gaskets functioning as seals, and also to decrease the transmission of the vibrations from the grinding unit to the sink.

The cup member 6 constitutes an entrance opening for the chamber 5; that is, the two members, in effect, may be construed as a single element defining a grinding housing having an upper entrance opening thereto. Thus, the chamber 5 of the grinder housing 4 receives the waste material to be ground and a quantity of water mixed with it through the cup-shaped member 6. At the bottom of the grinder housing is located grinder means such as described and claimed in U. S. Patent No. 2,577,152 to J. H. Powers, dated December 4, 1951; it includes a flywheel or rotary cutter 14 which is driven by means of an electric motor 15 of any suitable type. Cutter blades 16 on the wheel 14 cooperate with stationary cutters 17 on the inner walls of the housing so that when the wheel 14 is rotating, the garbage or other waste is ground or cut up into tiny pieces provided there is plenty of water present. Opposite the edges of the grinder flywheel are discharge openings or grooves 18 in the wall of the housing. When water is supplied in sufficient quantity, the comminuted waste will be washed through these openings through a discharge port 19 and to a drain pipe 20.

In order to make sure that sufficient water is carried through the device during the grinding operation, I provide a motor control element 21 which is located within or on the wall of the grinder housing alongside the chamber 5. This control is an electric switch connected in a circuit of the motor 15 and is operable to energize the motor only when sufficient water is present for grinding. The switch has an operating pin 21a on which is normally biased to a switch closing position (Fig. 6), but when the machine is not in operation is held in a switch opening position so that the motor is deenergized. When the switch is closed, it functions to connect the motor to an electric supply source 22 (Fig. 6) through a manually operable switch 23, which may be a wall switch, and a suitable contactor 24 which is closed to energize the motor circuit when the switch 21 is closed.

The switch 21 is mounted on the outside wall of a channel member 25 which is attached to the side wall of the upper portion of the chamber 4 and which when applied thereto defines a vertical channel 26 for the flow of water therethrough. The upper end portion of the side wall of the chamber 4 is formed with an opening 27 and below it with an opening 28, the former constituting an inlet to the chamber 26 and the opening 28 a discharge leading from the chamber 26. Thus, water which is introduced into the opening 27, flows down through the channel and discharges through the opening 28, which opening, it will be observed, is well above the grinding flywheel and its associated grinding means.

Located within the channel 26 is a combination flow responsive and float controller 29 which I will call the secondary control and which functions directly to control the operation of the motor switch 21. This member is shaped like an inverted cup, as more clearly shown in Figs. 1 and 3, and it is proportioned so that its top surface 30 fills a relatively large portion of the cross-sectional area of the channel 26. The member 29 is mounted upon a lever arm 31 which projects outwardly from the casing 25 through an aperture 32 and is held in pivotal relation with respect to the member 25 by means of a flexible diaphragm 33 formed of rubber or some other suitable flexible sealing material. The diaphragm 33 functions not only pivotally to mount the arm 31, but it also seals the arm 31 where it passes through the diaphragm, and the diaphragm also seals the opening 32. The arm 31 is connected to operate the switch 21 by means of a rocking lever member 34 of inverted U-shape, as shown, and which has its nexus pivotally mounted upon a shaft 35 which is journaled in bearings 36 attached to the housing 25. The arm 31, as shown, is passed through two relatively large openings 36a and 36b formed in the two legs respectively of the member 34. This member 34 is biased to engage the switch operating pin 21a to hold the switch open as shown in Fig. 6 by means of a compression spring 38 having its upper end bearing on the member 34 to tend to rotate it counterclockwise, as viewed in Figs. 2, 3 and 4. The lower end of this spring bears against an adjustable screw stud 39 which is threaded in a support bracket 40 also attached to the wall 25. In other words, the tension of the spring 38 is set by the adjustment screw 39 to hold the switch open with a predetermined force; and it requires, of course, an opposing force of greater magnitude than exerted by the spring to rotate the lever 34 clockwise (Figs. 2, 3 and 4) to permit the switch to close. This force is effected, first, by means of a predetermined quantity of water flowing downwardly in the channel 26 to engage the top of member 29 to depress it under certain conditions of operation, and second, under other conditions of operation, is effected when the member 29 is moved upwardly within the channel 26 responsively to establishment of a free liquid level in the channel at a certain height therein; it will be observed that when the member 29 moves downwardly, the lever 31 engages the top edge of the opening 36a (Fig. 2) to move the lever 34 clockwise, and also that when member 29 moves upwardly, lever 31 engages the bottom edge of opening 36b (Fig. 4) also to pivot lever 34 clockwise; and that clockwise movement of lever 34 in both cases permits the switch 21 to close. Preferably, the lever 34 will control the position of switch pin 21a through an adjusting screw 40a threaded through its nexus, as shown.

If desired, and it may be preferable in certain cases to do so, the upper surfaces of the member 29 may be corrugated which resist the flow of water downwardly and temporarily hold some of it, thereby to increase the load imposed on the controller as water flows downwardly. Or the controller may be made as shown in Figs. 3a and 3b. As there shown, it is in the form of an open-top, hollow or cupped spoon-like member 40f; it has a water engaging surface 40b between a pair of upright side walls 40c. This surface has a vertical rear wall 40d, a downwardly curved section 40e, these two sections being connected by a substantially horizontal section, as shown.

The first operation referred to above where the controller 29 (40f) is depressed by the down flow of water in the channel 26 is the normal functioning of the machine, and water is caused to flow into the opening 27 for grinding from the sink 1. The water is directed to flow into the opening 27 by means of a chute 41 which is formed in the upper end of the side walls of the chamber 4, as clearly shown in Fig. 1. The chute 41 directs the water into the top of the controller 29; or in the case of the controller 40f onto the forward part of the horizontal part of the wall 40b from which it swirls back in the pocket between this part and the rear wall 40d, thereby to load the controller and effect its downward movement.

The water is caused to flow into the chute 41 by means of a master control element 42 which not only functions as a master controller to effect the grinding operation, but also as a combination sink closure and sink draining device for normal sink functioning.

This master controller 42 is shown more clearly in Figs. 7 to 12, inclusive. As there shown, it comprises a lower circular plate 43 of disk-like form, and which has a downwardly extending peripheral flange 44, and an upper plate 45 superimposed upon it. Interposed between the peripheral edges of the plates is a sealing ring 46 formed of a suitable flexible material such as rubber and which has a U-shaped cross section, as shown. When the two plates are moved together, the sealing member is expanded or bulged outwardly beyond the peripheral edges of the plates for a purpose to be described later. The two plates are movable together by means of a knob 47 which extends downwardly through centrally arranged openings 48 and 49 provided in the upper and lower plates respectively, and which at its lower end portion carries a transverse pin 50 which is receivable in complementary slots 51 formed in the lower surface of the lower plate 43, as shown most clearly in Figs. 8 and 12. When the pin is received in the slots 51, the two plates are relatively widely spaced apart and the gasket is uncompressed, but when the knob 47 is turned 90 degrees in either direction from its position of Figs. 7 and 8 to its position of Fig. 10, the edges of the pin 50 cam downwardly over the edges of the slots 51 and thereby force the upper plate 45 to move downwardly with respect to the lower plate 43, which operation compresses the sealing member 46.

The knob 47 also functions as a handle for the master control 42 for removing it from the cup member 6 and for restoring it thereto. Thus, when the two plates are in their horizontal position, shown in Fig. 10, the knob 47 may be grasped to elevate the entire master control from the cup member 6 to completely open it for the insertion of waste material.

There is a coacting pivotal connection means between the controller 42 and the housing 4 which, in the form of the invention illustrated in the drawings, comprises a pair of aligned pins 52 lying in a transverse diametral axis extending across the bottom portion of the cup member 6, the cup member 6, as explained above, in effect constituting an upwardly extending continuation of the housing 4. As shown in Figs. 9 and 12, the lower plate 43 is provided at the ends of the diameter thereof with a pair of slots 53 opening downwardly and which are positioned to rest upon the pins 52 when the controller is inserted into the cup member 6, as clearly shown in Figs. 9 and 12. The pivotal connection means just described functions to support the controller in a normal sink closure position shown in Fig. 10; in an inclined position to the right as shown in Fig. 8 where it will effect operation of the grinder when water is supplied to the sink; and to an oppositely inclined position to the left as shown in Fig. 11 for normal sink draining. More specifically, when the controller is in its position of Fig. 10 and the knob 47 rotated 90 degrees in either direction from its position of Fig. 8 to its position of Fig. 10, the gasket 46 will be deformed outwardly to seal the discharge opening in the cup 6 and thereby seal the sink drain; but when the knob 47 is returned to its position of Fig. 8 to retract the seal 46 and then the master control be tilted to the right as in Fig. 8, the water supplied to the sink will discharge from the upper plate into the chute 41 and thence into the passage 26 to depress the controller 29 to start the grinder when a predetermined rate of water flows; or if when the control is in Fig. 10 and the knob 47 is turned to retract the sealing gasket 46 and then the control tilted to the opposite inclined position of Fig. 11, the machine will not function because water will be directed away from the discharge 41 and the sink may be operated as a normal sink in draining. A pair of curved walls 54 and 55 are provided on opposite sides of the knob 47 at the curved peripheries of the upper plate 45, as shown in Figs. 7 to 11, and which have adjacent edges 56 and 57 spaced apart to define discharge chutes for the water; that is, these walls confine the water and direct it from the knob to flow to the right into the chute 41 or to the left into the chamber 5, depending upon whether the control is inclined to the right as in Fig. 8 or to the left as in Fig. 11.

At the lower edge of the flange 44 depending from the bottom plate 43 are a pair of stops 58 and 59 which function to hold the control 44 in its two respective inclined positions of Figs. 8 and 11.

Under certain conditions of operation, as when a relatively large quantity of waste food matter is allowed to accumulate in the chamber 4, or when, because of its character, the drain openings 18 are stopped to prevent the flow of water through the machine, or at least to retard its flow substantially, water will accumulate in the chamber 4 due to normal sink draining. Should the level of the water rise so high as to intercept the stream flowing downwardly from the chute 41 when the controller 42 is set for a grinding operation (Figs. 1 and 8), it would prevent it from engaging the secondary controller and the machine would not operate in the absence of the float control feature of this invention. But by arranging the secondary controller 29 as a combination float responsive and flow responsive element, in accordance with this invention, the machine will still operate satisfactorily. In other words, as the level of the water rises, the free liquid level will compress the air which is contained in the cup-shaped member 29 and eventually will elevate it sufficiently high to effect the starting of the motor 15 once the wall switch 23 is closed; and here again, since the chamber 4 will be substantially filled with water, the machine will operate with a proper quantity to effect proper comminution of the waste material. This same flow response also will insure continued operation of the machine if for any reason during the normal operation water should "back up" in the chamber 5.

It will be observed that I have effected a very simple master control element for conditioning the machine for its grinding operation, and also for sealing and for draining the sink for normal sink operations, and further that I have provided an effective and simple means for insuring operation of the machine only in the presence of the proper quantity of water.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In a waste grinding unit of the type which has a waste and water receiving casing, a motor driven grinder in the casing and a discharge beyond the grinder, that improvement which includes a water flow directing member in the path of water flow into said casing, a water confining passage with an inlet adjacent said member to receive water therefrom and an outlet in said casing arranged to direct water into said casing above the grinder, and a combination flow responsive and float grinder drive controller in said passage operable to effect the operation of said motor driven grinder responsively both to a predetermined rate of flow of water in said passage and to the establishment of a predetermined liquid level in said passage whereby the grinder may operate only in the presence of water.

2. In a waste food grinder unit of the type which has a substantially vertical waste and water receiving casing, a motor driven grinder in the casing and a discharge beyond the grinder, that improvement which includes a water flow directing member in the path of water fed to said casing, a water confining substantially vertical passage with an inlet adjacent said member to receive water therefrom and an outlet in said casing arranged to direct water into said casing above the grinder, a control element for said motor driven grinder operable to effect the operation thereof when moved from one position to another position, a combination flow responsive and float control member in said passage operable downwardly from a neutral position by the free flow of water thereon received from said directing member and to float upwardly from said neutral position upon the establishment of a free liquid level in said passage at a predetermined height therein, and connection means between said control member and control element driving the latter from said one to the said other position in response to the downward motion of said control member for a predetermined distance from said neutral position by the free flow of water in said passage, and also when said control element floats upwardly a predetermined distance from said neutral position in response to a rising free liquid level in said passage.

References Cited in the file of this patent

UNITED STATES PATENTS

| 2,199,964 | Rook | May 7, 1940 |
| 2,273,480 | Yates | Feb. 17, 1942 |
| 2,354,282 | Shaw | July 25, 1944 |
| 2,464,018 | Bloch | Mar. 8, 1949 |
| 2,469,205 | Powers | May 3, 1949 |
| 2,518,176 | Powers | Aug. 8, 1950 |

FOREIGN PATENTS

| 22,152 of 1908 | Great Britain | June 10, 1909 |